United States Patent [19]

Wright

[11] Patent Number: 4,724,449

[45] Date of Patent: Feb. 9, 1988

[54] METHOD AND APPARATUS FOR STEREOSCOPIC PHOTOGRAPHY

[76] Inventor: Douglas Wright, 7 Saxon Rd., So. Farmingdale, N.Y. 11735

[21] Appl. No.: 843,991

[22] Filed: Mar. 25, 1986

[51] Int. Cl.$^4$ .............................................. G08B 35/08
[52] U.S. Cl. ................................................... 354/112
[58] Field of Search ............................... 354/112, 113

[56] References Cited

U.S. PATENT DOCUMENTS

| | | | |
|---|---|---|---|
| 2,175,114 | 10/1939 | Friedmann et al. | 354/112 |
| 3,491,669 | 1/1970 | McBride | 354/112 |
| 3,494,270 | 2/1970 | Shibata | 354/112 |
| 3,524,395 | 8/1970 | Alasia | 354/112 |

Primary Examiner—Donald A. Griffin
Attorney, Agent, or Firm—Darby & Darby

[57] ABSTRACT

A method and apparatus for taking photographs for use in three-dimensional photography in which the object is photographed from a number of positions which are spaced apart. The camera film plane is kept in a common plane at each position and at each position the optical center of the lens is kept in a plane generally parallel to the film plane and shifted in the plane to compensate for the different positions to have the same field of view at each position.

17 Claims, 5 Drawing Figures

METHOD AND APPARATUS FOR STEREOSCOPIC PHOTOGRAPHY

The subject invention relates to a method and apparatus for taking stereoscopic, i.e., three-dimensional photographs of improved clarity and with minimized distortion.

BACKGROUND OF THE INVENTION

As is known, stereoscopic photographs are used for a variety of purposes such as, for example, advertising, visual inspection of articles, cartography, etc. Various systems exist for taking three-dimensional photographs including, for example, the most well known one of the taking of two pictures from different angles through lenses with different color filters and the provision to the viewer of lenses of different colors to match them.

Other systems are typified by patents such as Wah et al. U.S. Pat. No. 4,086,585 which utilizes a plurality of cameras located side by side on the same image plane with the lens of each camera directed straight ahead and each camera takes a slightly different picture of an object depending on the field of view of its lens. Since the cameras are spaced apart, the optical center of the picture is not the same for each camera. Accordingly, distortion can occur.

Another prior art arrangement, for example as shown in U.S. Pat. No. 3,491,669 to McBride, uses a plurality of cameras which are spaced around an arc with the central focal line of each camera's lens passing through the center of the object whose picture is to be taken. This arrangement also has a problem in producing angular distortion.

The present invention relates to a novel method and apparatus for taking three-dimensional pictures of an object in which a plurality of cameras are used, or a single camera is operated sequentially on a side by side basis, to take a plurality of separate pictures of the same object. Each of the cameras, or single camera, has its film negative located on a straight line passing through the image plane of each camera at a different position. In accordance with the invention, the lens of each camera, depending upon its position relative to the object whose photograph is to be taken, is shifted relative to the film image plane of the camera so that it has the same field of view with the same field of view extremities relative to the object and the same focus point on the object relative to a line from the center of the lens. Upon development and processing of the series of film negatives taken with the system, a three-dimensional picture with a minimum amount of distortion is obtained.

It is therefore an object of the present invention to provide a method and apparatus for taking three-dimensional photographs.

A further object is to provide a method and apparatus for taking three-dimensional pictures in which a plurality of photographs of the object are taken from different points along a straight line along which the image plane of the camera, or each of a plurality of cameras, lie.

An additional object is to provide a method and apparatus for producing three-dimensional photographs which includes an arrangement for using one or more cameras to take photographs of the same object from different spaced locations along a line with the same field of view and same object focus point.

Another object is to provide a novel camera in which the lens can be shifted in a plane spaced from and parallel to the image plane of the camera.

A further object is to provide a camera arrangement for taking three-dimensional photographs of an object in which the camera body and lens can be shifted relative to one another.

Other objects and advantages of the present invention will become more apparent upon reference to the following specification and annexed drawings in which.

Figure 1:
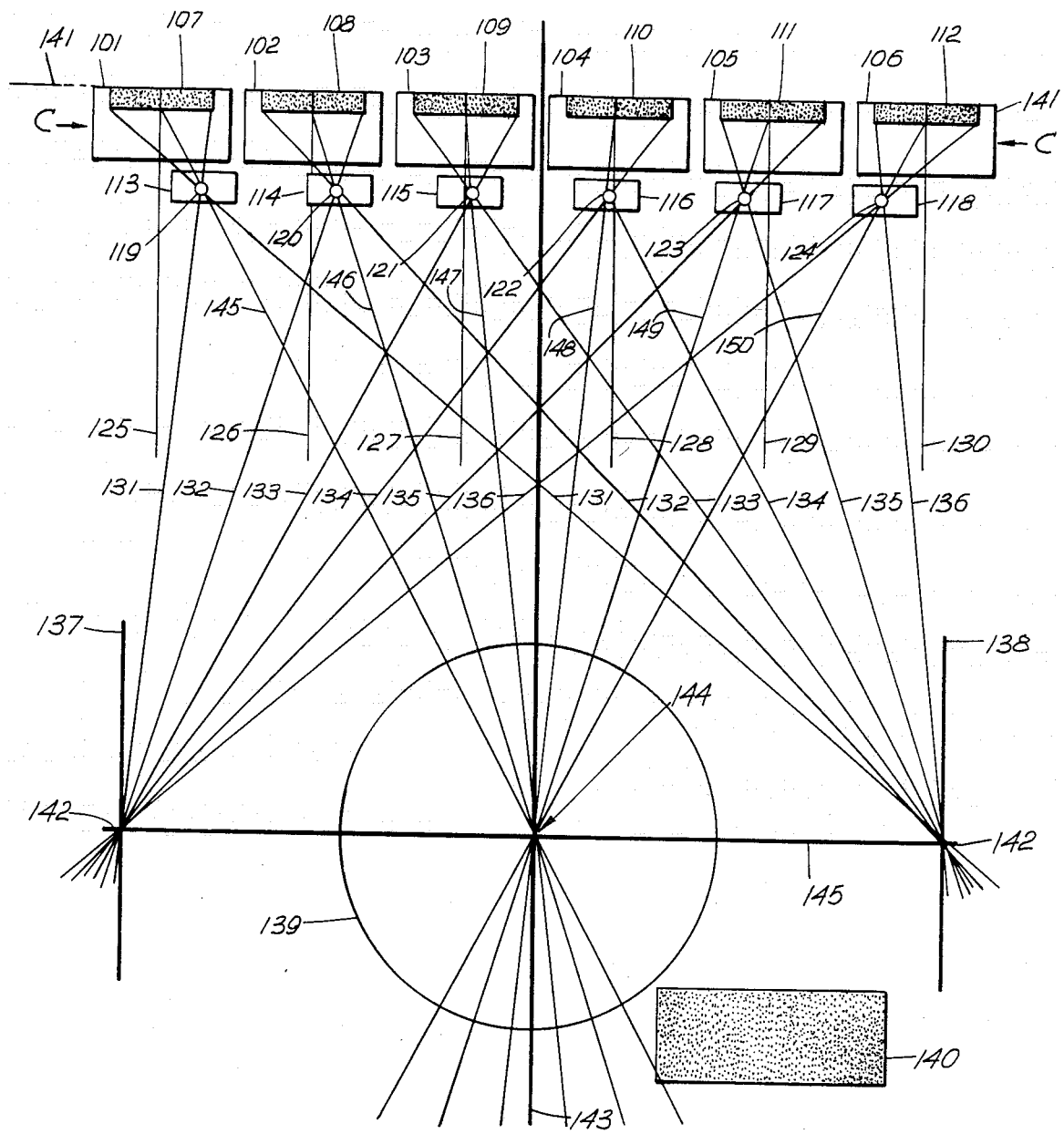
FIG. 1 is a schematic view, looking from the top down onto an object, demonstrating the manner in which a three-dimensional picture is taken in accordance with the present invention.

FIG. 1 shows an overall schematic top view of the invention for taking a plurality of photographs, either successively or simultaneously, of a three-dimensional object 139 which is shown illustratively as a sphere to portray the three-dimensional character of the object. It should be understood that the object 139 also extends into and out of the plane of the paper. The object has a focus point 144 at its center. A background object 140 is shown for reference purposes.

Reference numerals 101–106 show a plurality of different positions of a single camera body C, which is progressively shifted to the different positions, or a plurality of camera bodies which are located in the positions, from which the different pictures of the object 139 ar to be taken. In practicing the invention, the film plane of the camera body or bodies C at all of its (their) positions 101–106 lie along the same straight line 141. The film in the camera at each of the positions 101–106 is located in the same plane relative to the camera body. Six locations 101–106 are illustrated shown although fewer or more can be used. Four positions and four pictures produce reasonably satisfactory results and the addition of more positions increases the quality of the picture. Where a plurality of cameras are used, the lens for each camera preferably has the same characteristics.

The camera film plane line 141 is parallel to a straight line 145 forming the object plane passing through the extremities 142 of the angular field of the camera lens at each camera position 101–106, as described below. Where a single camera is used which is shifted into the plurality of successive positions 101–106, such as from left to right relative to the object, there preferably is a common support rail for defining film plane line 141, or a line parallel to it, along which the camera moves. The same holds true where a plurality of cameras are used. The single camera, or each camera, ha an arrangement for adjusting the lens from side to side and up and down relative to the camera body and its film and film plane. This is described below with reference to FIG. 3.

As seen in FIG. 1, at each of the successive positions, 101–106, the film in the camera body is shifted in location relative to the object. That is, in going from left to right across the figure, the location of the film onto which the object is imaged changes relative to the object. A respective line 125–130 drawn perpendicular to the film plane at each location shifts from left to right.

In accordance with the invention, the position of the lens of the camera is changed at each location relative to the camera body and the film plane so that the same filed of view is photographed from each camera location 101-106. This is done by adjustment of the lens relative to the camera body, generally in a plane parallel to the plane of the film, so that the picture of the object will be taken relative to the extremities 142 of the field of view of the lens at each camera position 101-106. Lines 137 and 138 represent the left an right viewing extremities of the camera lens and the frame of the film at each of the positions 101-106.

In going from camera positions 101-106, the position of the lens is moved, by shifting its lens holder relative to the camera body by a different amount in the manner to be described below, to the successive lens positions 113-118, corresponding to the camera positions 101-106.

Each of reference numerals 119-124 indicates the lens center relative to the center of the film, illustrated by a corresponding center line 125-130 and the camera body, at each of the various camera body positions 101-106 going from left to right. For example, referring to the left-most camera position 101, the lens holder is shifted to the right of the center of the film by a distance between the point 119, where the lens center actually is, to the point 125 where it would normally be, i.e., at the center of the film as shown by line 125. Similarly, in camera position 102, the lens is shifted closer to the film center line 126 where it would normally be, and in camera position 103 it is even closer to the film center line 127.

As the camera position is moved past the center of the arrangement, i.e., past a line 143 extending transversely from the center of the object which extends through the object center focus point 144, the lens is shifted to the other side of the film center line. For example, at camera position 104, the lens at position 122 is to the left of the film center line 128. The lens is progressively moved even further to the left relative to the camera body to position 123 in camera position 105 further to the left of the film center line 129. The lens is moved to its most position 124 to the left of the film center line 130 in camera position 106.

It should be noted that in each of the successive camera positions 101-106, the camera lens defines a field of view having corresponding left and right image view extremities respectively designated by the pairs of lines 131, 132, 133, 134, 135 and 136 for the corresponding camera positions 101-106. For example, the line pair 131 shows the field of view with the lens shifted to the right by the maximum amount relative to the camera body in the left-most camera position 101. In camera position 102 lines 132 show the extremities of the field of view. With the camera body in the extreme right position 106, the lens is in the maximum position 118 to the left, and the lens field of view is defined by the line pair 136. In each camera position, the extremities of the field of view defined by the line pairs 131 through 136 pass through the same points 142 where the object plane line 142 intersects the field of view extremity lines 137-138. Thus, the field of view at each camera position 101-106 is the same.

As seen in FIG. 1, as the camera position shifts from left to right the center line of the field of view for the corresponding positions 101 through 106 is 145 through 150. Each of the center lines passes through the focus point 144 on the object plane line 143. Thus, as should be clear, in each of the positions 101-106 of the camera body the same field of view exists as defined by the extremities 137, 138 and there is the same focus point 144 for the object.

Figure 2:
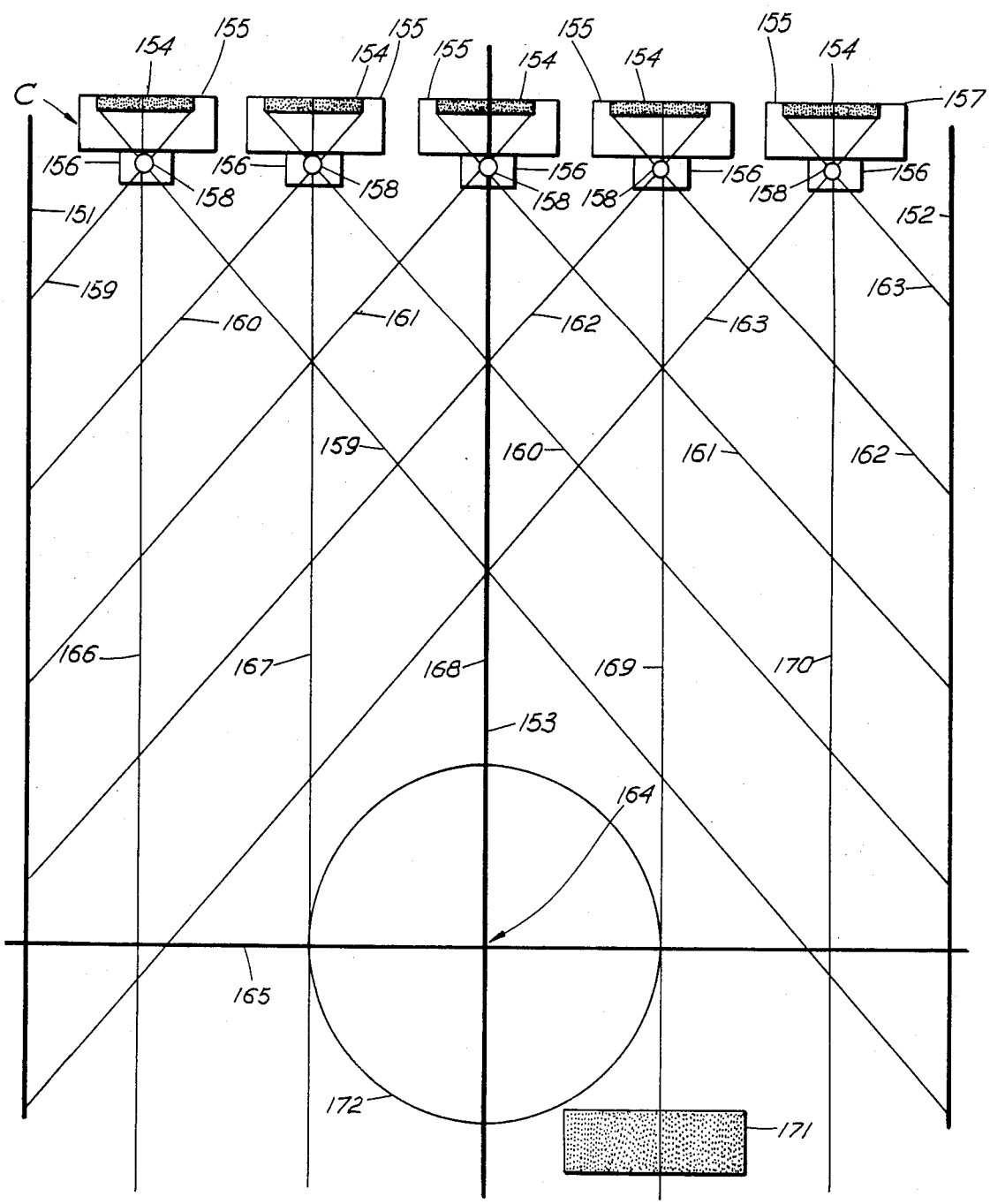
FIG. 2 is a view similar to FIG. 1 showing a prior art method and apparatus.

FIG. 2 shows the pictures which would be taken if the lens was not shifted relative to the film in the camera body and maintains the same position 156 relative to the film at each of the camera positions. As seen in FIG. 2, there is an object 172 located relative to background object 171 within the left and right field of view lines 151 and 152.

The camera body C has a film 154 at each of the multiple locations, here shown as five, and the lens 156 is fixed relative to the camera at the respective lens centers 158. As in the case with the cameras at each position in FIG. 1, the lenses have the same characteristic if multiple cameras are used. As seen, the center of the field of view from the camera at each of the positions is straight ahead and designated by the respective lines 166, 167, 168, 169 and 170. Also, the images which are focused onto the film 154 at each of the camera positions going from a left to right have different fields of view. In the leftmost camera position, the field of view is designated by the line pair 159, at the next position to the right by the line pair 160, in the next position to the right by the line pair 161, with the next to last right-most position by the line pair 162 and in the extreme right position by the line pair 163.

The film image center is shown by the line 153 which is achieved when the camera is the center position. As seen, there is the central focus point 164 at the center of the object 172, and there is an object focal plane 165 on which the left and right image pair lines 159, 160, 161, 162, and 163 are focused. The center line of the field of view at each of the camera positions is shown by the lines 166, 167, 168, 169 and 170. As seen, most of the center lines of the field of view pass through the central object focus point 164. Also, each field of view at each camera position is different. This arrangement gives use to the possibility of distortion since the center focus point of the object is taken at only the central position of the camera.

Figure 3:
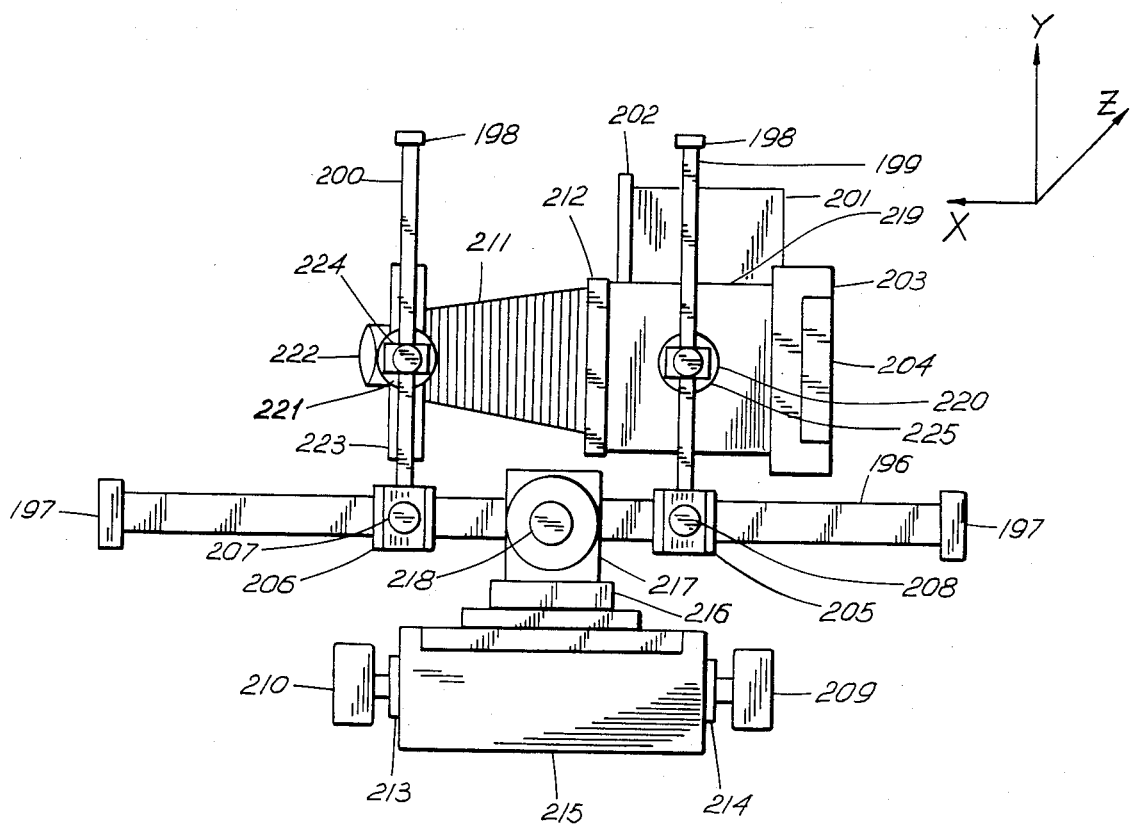
FIG. 3 is a side elevational view showing the arrangement for adjusting the positioning of the various components of a camera according to the invention.
Figures 4A, 4B:
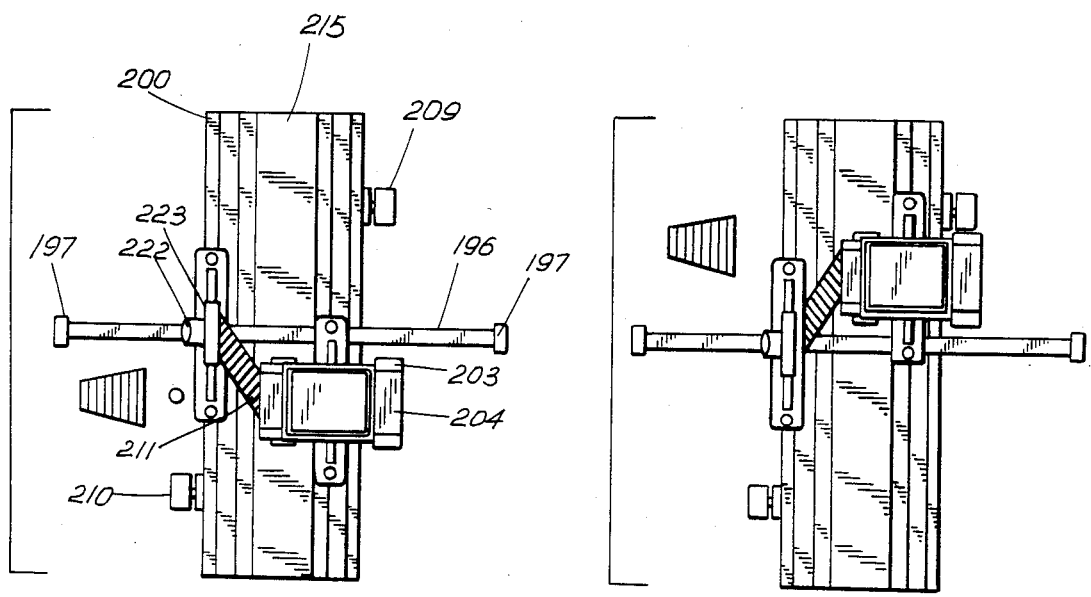
FIGS. 4A and 4B are top views of the camera arrangement of FIG. 3.

FIGS. 3, 4A and 4B shows the details of one of the camera or one of the plurality of cameras used with the present invention including the mechanism for various adjustments to obtain the desired images on the film at each of the different camera locations 104-106 in FIG. 1. FIG. 3 is a side view and FIGS. 4A-4B is a top view.

The arrangement includes horizontal support rail 196 having end caps 197 thereon so that the camera body 219 and related position adjusting mechanism will not travel off of the rail. The rail 196 is part of a rack and pinion arrangement which permits the camera body 219 and the camera bellows 211 and lines 224 as a unit relative to the rail in the ±X direction for focusing the lens relative to the film.

Toward the back (right) of the rail 196 is a back rail vernier bracket 205 on which is transversely mounted a vertical support post 199 having an end cap 198 at the top thereof. Post 199 also preferably is of the rack type. The camera body 219 has a height adjustment bracket 225 attached thereto which is moved, for example by a vernier type pinion, along vertical support post 199. Bracket 225 has a lock 220 so that the camera body can be precisely vertically adjusted (±Y direction) and held relative to the vertical support post 199.

The camera body 219, which is of generally conventional construction, has attached to it a conventional view finder 201, with a view finder cover 202. It also has a conventional film back 203 and film holder 204.

A bellows bracket 212 is attached to the front of the camera body from which a bellows 211 extends. A lens holder 223 with a lens is mounted on the front of the bellows 211. Adjustment of the lens 223 and the bellow 211 is effected in the ±Y direction by a vernier type support bracket 221 which travels along a vertical support post 200 which is mounted in a vernier type adjustable support bracket 206 on the rail 196. The lens support bracket 221 has a lock 224 to set its vertical position along support post 200.

As seen in FIGS. 4A and 4B, support rails 207 and 208 extend horizontally in the Z direction from the support brackets 207, 208. Rails 207, 208 are also of the rack type having the vertical support posts 200, 199 mounted thereon by suitable vernier adjustments so that post 199, 100, which have the camera body and lens holder connected thereto can be moved along the rails 207, 208 in the ±Z direction. This provides for the lateral shifting of the lens relative to the film in the camera body as described in FIG. 1. FIG. 4A shows the lens to the right of the camera body and FIG. 4B shows it to the left.

As seen, the camera body 219 and the bellows 211 and lens 222 combination are independently adjustable relative to the support rail 196 in the ±X direction via the support brackets 205, 206, which ride on the rail 196; in the ±Y direction along the two vertical posts 199 and 200 via the brackets 224 and 225; and in the ±Z direction along the horizontal rails 207, 208. Thus, the center of the lens can be moved in any direction relative to the film plane in the camera body, and vice versa.

The support brackets 220 and 224 which ride on the vertical support posts 199 and 200 also are made to permit angular adjustment of the camera body 219 and the lens, i.e. arcuate movement in the x-z plane.

The complete camera assembly and the various elements for adjusting the camera body and lens relative to each other in the X, Y and Z directions is mounted on a main support bracket 217 which carries the horizontal rail 196. Bracket 217 is mounted on a main support track 215 of the rack and pinion vernier type with scale markings 216 therealong and having an adjustment control 209 with a lock 210. This permits a single camera to be moved along the length of track 215 to the plurality of positions shown in FIG. 1, each of a plurality of cameras to be adjusted along the length of the track (±Z direction).

The apparatus of FIGS. 3 and 4 permit the lens to be adjusted relative to the camera film plane to achiever proper focus and also to provide the lateral adjustment seen in FIG. 1. Also, the vertical position of the camera and lens can be set to accommodate for objects of various heights. Accordingly photographs of the type referred to in FIG. 1 can be made with ease and precision.

What is claimed is:

1. Apparatus for producing a three-dimensional photograph of an object comprising:
    camera means including a lens having an optical center and a film lying in a film plane for taking a photograph of the object from each of a plurality of positions spaced from each other, means for maintaining the film plane in a common first plane at each of said posiitions,
    and means for shifting the optical center of the lens in plane substantial parallel to the camera film plane at each position to compensate for the difference in position of said camera means relative to said object at each said photograph-taking position.

2. Apparatus as in claim 1 wherein said lens shifting means comprises means for shifting the lens relative to the camera and its film.

3. Apparatus as in claim 2 wherein said camera means include a camera body and said lens shifting means comprises a bellows having one end attached to said camera body, said lens being attached to the other end of the bellows, and means for moving said lens relative to said camera body.

4. Apparatus as in claim 3 further comprising means for moving said camera body.

5. Apparatus as in claim 1 wherein said means for maintaining the camera film plane in the common first plane comprises an elongated rigid frame means, said camera means being positioned along said frame means at each said position.

6. Apparatus as in claim 5 wherein there is a single camera means which is positioned along said frame means to establish each of said positions.

7. Apparatus as in claim 5 further comprising a plurality of camera means respectively positioned along said frame means to establish said plurality of positions.

8. Apparatus as in claim 1 wherein said lens shifting means shifts the optical center of the lens at each position of the camera means to be on the same focus point of the object.

9. Apparatus as in claim 1 wherein said lens shifting means shifts the lens to have the same field of view at each position of said camera means.

10. Apparatus as in claim 1 wherein said lens is in the same common plane which is parallel to said first plane at all said positions.

11. A method of photographing an object for producing a three dimensional photograph of said object comprising the steps of:
    providing a camera having film in a film plane and a lens,
    taking a photograph of said object with a camera at each of a plurality of positions spaced at a distance from each other with the camera film plane being in a first common plane at each said position, and
    shifting the optical center of the lens in a plane generally parallel to the camera film plane at each said position of the camera to compensate for the shift in camera position relative to the object.

12. A method as in claim 11 wherein the optical center of the lens at each position of the camera is on the same focus point of the object.

13. A method as in claim 12 wherein the extremities of the field of view of the lens at each said position is the same.

14. A method as in claim 12 wherein the optical center of the lens is in a common plane at each said camera position.

15. A method as in claim 11 wherein the extremities of the field of view of the lens at each of the camera position is the same.

16. A method as in claim 11 wherein the step of shifting the optical center of the lens comprises moving the lens relative to the camera.

17. A method as in claim 11 wherein the optical center of the lens is in a common plane at each said camera position.

* * * * *